United States Patent [19]

Rubin et al.

[11] Patent Number: 4,569,259
[45] Date of Patent: Feb. 11, 1986

[54] AUTOMOBILE WHEEL COVER LOCKING BOLT AND WRENCH COMBINATION

[76] Inventors: Sol R. Rubin, 917 Hartford Way, Beverly Hills, Calif. 90247; John S. Marcus, 2912 Montana Ave., Santa Monica, Calif. 90403; James D. Holly, 2332 33rd St., Santa Monica, Calif. 90405

[21] Appl. No.: 603,601

[22] Filed: Apr. 25, 1984

[51] Int. Cl.⁴ .......................................... B25B 13/06
[52] U.S. Cl. ............................ 81/121.1; 81/176.15; 81/460; 411/402; 411/910
[58] Field of Search ............... 81/121 R, 90 C, 90 B, 81/90 E, 176.1, 176.15, 176.2, 121.1; 411/910, 402, 403, 405, 410, 427, 429

[56] References Cited

U.S. PATENT DOCUMENTS

| | | |
|---|---|---|
| 3,279,838 | 10/1966 | Hamilton . |
| 3,449,988 | 6/1969 | Gallo, Sr. . |
| 3,519,979 | 7/1970 | Bodenstein .......................... 411/910 |
| 3,874,258 | 4/1975 | Semola et al. . |
| 3,878,740 | 4/1975 | Gutshall . |
| 4,027,572 | 6/1977 | Burge . |
| 4,109,691 | 8/1978 | Wilson . |
| 4,125,913 | 11/1978 | Lewis ................................ 81/121 R |
| 4,242,932 | 1/1981 | Barmore . |

FOREIGN PATENT DOCUMENTS

| | | |
|---|---|---|
| 763737 | 8/1951 | Fed. Rep. of Germany ...... 411/403 |
| 64946 | 7/1955 | France ................................ 411/402 |
| 1196287 | 5/1958 | France . |
| 429532 | 1/1948 | Italy ................................... 411/402 |

*Primary Examiner*—James L. Jones, Jr.
*Attorney, Agent, or Firm*—Henry M. Bissell

[57] ABSTRACT

Correspondingly keyed combination of a round-headed bolt fastener and a generally cylindrical socket, preferably for use in securing an automobile wheel cover against theft. The fastener has a plurality of axial slots, or lock impressions, about the periphery of the circular head which may be spaced in accordance with a preselected code. The wrench socket is provided with a corresponding number of key elements projecting inwardly from the cylindrical wall of the socket, the position of the key elements being in accordance with a preselected code. When the key code of the wrench matches the lock code of the fastener, the wrench socket may be slipped over the fastener head with the key elements engaging the lock impressions so that the wrench may tighten or untighten the fastener. The fastener has an axial recess extending from the outer face of the head with an inner beveled surface about the recess opening. The head also has an outer beveled surface extending about its outer periphery which provides a bearing surface for supporting the key elements during rotation of the socket until the matched position of the key elements and the lock impressions is reached. The socket has an axial pin extending flush with the end plane of the socket for alignment with the fastener head recess to guide the wrench during initial engagement with the head. The socket also has an inner angled portion extending between the base of the socket and the axial wall portion which matches the angle of the outer beveled surface of the fastener head. When the socket is in full engagement on the fastener head, the engagement of the central pin in the axial recess and the contact of the angled surface of the socket with the beveled surface of the head serve to stabilize the alignment of the wrench socket on the fastener head during transmission of torque from the wrench to the fastener.

32 Claims, 5 Drawing Figures

U.S. Patent  Feb. 11, 1986  4,569,259
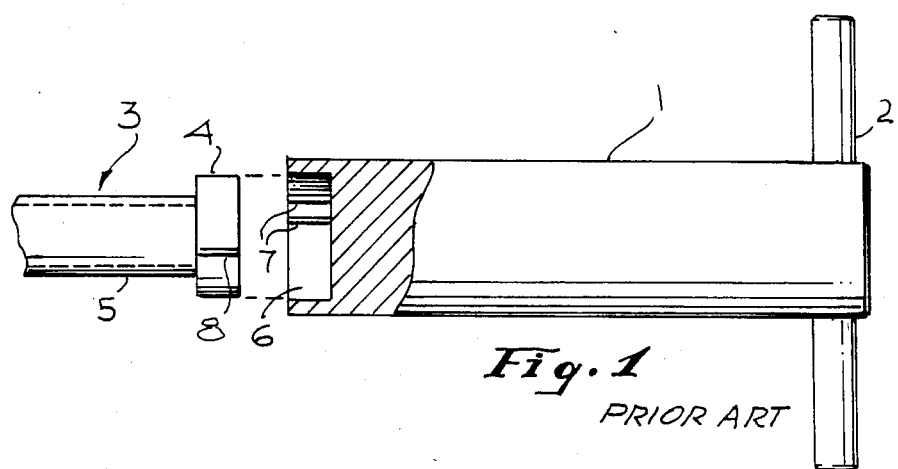
Fig. 1 PRIOR ART
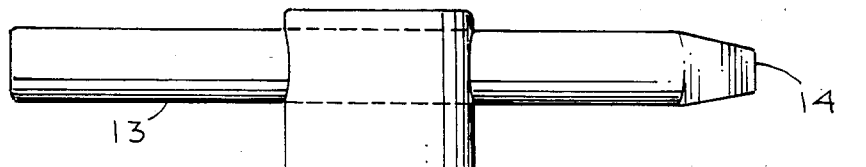
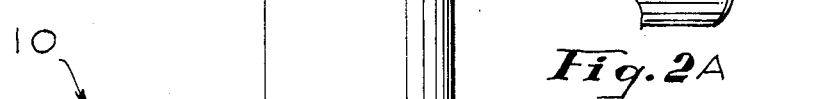
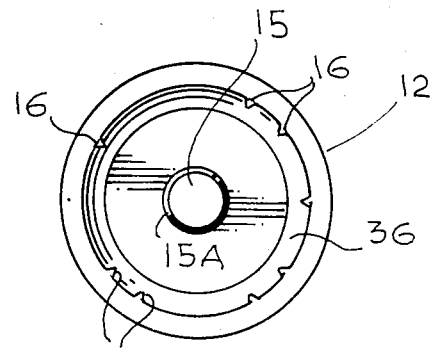
Fig. 2A
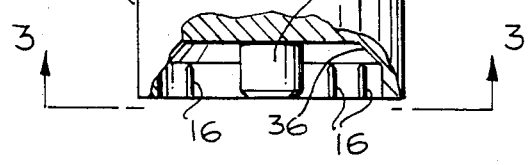
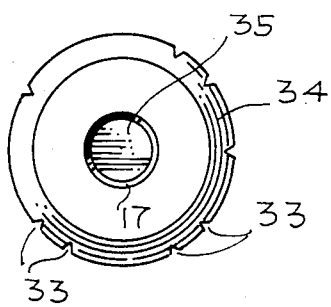
Fig. 3
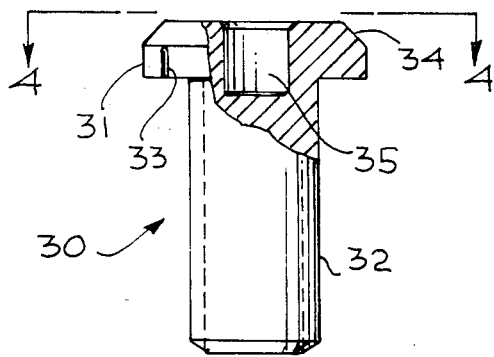
Fig. 2
Fig. 4

AUTOMOBILE WHEEL COVER LOCKING BOLT AND WRENCH COMBINATION

BACKGROUND OF THE INVENTION

1. Field of the Invention

The present invention relates generally to a drive wrench and fastener combination and, more particularly, to a drive wrench and fastener combination which employs an axial guide pin and a plurality of coded key elements disposed in a socket which mate with a corresponding recess and lock impressions disposed in the fastener.

2. Description of the Prior Art

Heretofore, numerous drive wrenches and screwdrivers have been designed to assist in installing and removing fasteners of various kinds for use in various applications. A variety of these configurations are shown in U.S. Pat. No. 3,878,740 issued to Charles E. Gutshall, entitled Wrench Socket Assembly; U.S. Pat. No. 3,449,988 issued to J. Gallo, Sr., entitled Speed Tool With Guide Pin; U.S. Pat. No. 4,242,932 issued to Thomas C. Barmore, entitled Fastening Device; U.S. Pat. No. 3,279,838 issued to Douglas Hamilton, entitled Locking Securement For Sheet Metal Housing Cover; U.S. Pat. No. 4,109,691 issued to Floyd Wilson, entitled Combination Torque Release Screw and Screwdriver; and French Pat. No. 1.196.287 issued to M. Monticelli.

The Gutshall patent discloses a socket wrench which is used to tighten a torque limited fastener that is kept from wobbling on the head of the fastener during tightening. This socket wrench is designed for use with hex head type screws or bolts with weakened corners. The socket is designed to slip around the weakened corner once the desired torque is applied. The socket is kept from wobbling by a pressed-in insert which includes a projection which may be inserted into a recess in the head of the screw.

The Gallo patent discloses a speed wrench or screwdriver which employs a protruding guide pin that inserts into a hole in the fastener for the purpose of locating the fastener on the wrench. A plurality of externally located key elements or fingers in the socket are inserted into a matching plurality of eccentric apertures in the fastener which secure the tool to the fastener during operation.

The Barmore patent discloses a tool for use with a hex head or similar type fastener having a specially broached hole therein. The tool includes a protruding pin which is used as an auxiliary drive member that engages the specially broached hole to permit better engagement between the tool and fastener as more torque is applied.

The Hamilton patent shows a fastener employing a socket head arrangement with a projecting prong which prevents the use of a standard Allen key for installation or removal. The prong allows a special tool, such as a modified Allen key to be used to remove the fastener.

The Wilson patent discloses a screwdriver which has an axial projection to assist the tool in engaging a specially designed torque-limited screw. The tool has specially designed cam projections which engage lugs on the screw. The lugs break off once the desired torque is reached.

The Monticelli patent seems to show a tool having a spring loaded pin and a plurality of external key elements or fingers utilized for engaging some type of fastener or similar device.

These patents disclose a wide variety of wrench and fastener combinations. Some of the wrenches employ an axially located pin which may be employed to prevent wobbling or which is generally used to assist in locating the fastener in or on the wrench. However, none of these patents disclose wrenches which may be readily employed with round or cylindrically headed screws or bolts. In addition, none of the patents disclose the use of rounded or beveled key elements on the inner periphery of a socket which, when placed in contact with the bolt and in conjunction with an axial pin, assist in mating the wrench with the fastener. None of the patents disclose a wrench and fastener combination that employs axially oriented lock impressions on the outer periphery of the head of the bolt and corresponding key elements on the inner periphery of the socket head. In addition, none of the patents disclose the use of a screwdriver-like handle arrangement which may be employed to remove covers or caps or the like covering the fastener which is to be removed.

There is also known in the prior art a fastener and wrench combination which employs a plurality of axially slotted lock impressions disposed on the periphery of the fastener head and a corresponding plurality of key elements disposed on the inner periphery of the socket which allow for a coded key/lock wrench combination. That combination has proven, however, to present certain difficulties in mounting the wrench on the fastener head, particularly when such must be done in the dark or under other trying circumstances such as in the rain, alongside a road in heavy traffic, and the like.

It is therefore an object of the present invention to provide a combination wrench and fastener which permits entrance of the fastener head into the wrench socket prior to key/lock engagement so that the two members of the combination may be guided in alignment while the socket is being rotated into a position where the keys and lock impressions mate, and which further stabilizes the wrench on the fastener while tightening or untightening the fastener.

It is also an object of the present invention to provide a wrench which includes a transversely affixed handle that has a prying tip or tool disposed on at least one end thereof which may be employed to remove a protective cap covering the fastener to be removed or installed.

SUMMARY OF THE INVENTION

In accordance with these and other objects and features of the present invention, there is provided a fastener and wrench combination which allows the wrench socket to be easily aligned and mated with the fastener and which also stabilizes the wrench while tightening or untightening the fastener. The fastener includes a threaded shank and a circular head, with the head being beveled around the periphery thereof. The fastener has a predetermined plurality of axially slotted lock impressions disposed around the periphery of the head and positioned in accordance with a selected key code. Also, the head has a circular recess, axially disposed to a predetermined depth therein, with the periphery of the recess being beveled adjacent the outer face of the head of the fastener.

The wrench comprises a body having a socket at one end and a transversely affixed handle at the other end. The handle has a prying tool disposed on at least one end thereof. The socket has a cross section adapted to mate with the fastener, including a plurality of rounded or beveled key elements disposed on the inner periphery thereof in accordance with the selected code. The inner edge of the socket may also be beveled, although this is not essential. The key elements are adapted to match the slotted lock impressions of the fastener. The socket also has a slightly beveled cylindrical pin disposed along its axis which extends to a point generally flush with the end plane of the socket. This pin is designed to mate with the corresponding circular recess in the fastener.

The pin is designed to mate with the recess of the fastener in order to act as a guide while the socket is being rotated to the position where the key elements mate with the slotted lock impressions. In addition, the mating configuration of the operative surfaces of the fastener head and socket interior, including the recess in the head and the axial pin of the socket, serves to stabilize the wrench in position on the fastener while tightening or untightening the fastener. The rounded or beveled surface of the fastener and the rounded or beveled key elements of the socket are designed to contact each other during the mating process. The edge of the socket need not be beveled, as long as the key elements contact the fastener. The rounded nature of these elements allows the wrench to freely rotate on the surface of the fastener until the key elements mate with the slotted lock impressions. Thereafter, the socket mates with the fastener and the tightening or untightening process can occur.

In particular, the present invention may be employed as a wheel cover locking bolt and wrench combination for use with automobile wheel covers, or the like. The design of the wrench and fastener combination allows for ease of installation and removal, while preventing unauthorized removal of the fastener, since the special key wrench is required. Also, since it is common for wheel cover bolts to be hidden underneath a cover plate, or the like, the integral prying tool of the handle allows for removal of this cover plate prior to installation or removal of the fastener.

BRIEF DESCRIPTION OF THE DRAWING

A better understanding of the present invention may be had from a consideration of the following detailed description, taken in conjunction with the accompanying drawings in which:

FIG. 1 is a side elevation, partially broken away, of a wrench and fastener combination of the prior art;

FIG. 2 is a side elevation, partially broken away, of the wrench and fastener combination of the present invention;

FIG. 2A is a view of a portion of the wrench of FIG. 2, showing an alternative variation thereof;

FIG. 3 is a view taken along the line 3—3 of FIG. 2, looking in the direction of the arrows; and FIG. 4 is a view taken along the line 4—4 of FIG. 2, looking in the direction of the arrows.

DESCRIPTION OF THE PREFERRED EMBODIMENT

FIG. 1 shows the configuration of a fastener and wrench of the prior art. The wrench 1 is shown having a cross handle 2 and a cylindrical socket 6. The fastener 3 has a cylindrical head 4 and threaded shank 5. The head 4 is provided with a plurality of axial slots 8, like the slots 33 of FIG. 4, while the socket 6 is provided with a plurality of radially inwardly projecting key elements 7, like the key elements 16 of FIG. 3.

In operation, the prior art wrench 1 is placed adjacent the head 4 of the fastener 3 and rotated until the coded set of key elements 7 mates with the correspondingly coded set of lock elements 8. The problem withh this configuration, however, is that there is no way of guiding the wrench and fastener head together until the key and lock elements are lined up. During rotation of the wrench 1, there is a tendency for it to slip out of alignment with the head 4 and attempts to use the wrench in this fashion can be very frustrating, especially where one is required to use the tool without sufficient illumination or along a busy freeway or in bad weather, etc.

Referring to FIG. 2, a view of a wrench and fastener combination in accordance with the present invention is shown. A wrench 10 in accordance with the present invention comprises a cylindrical body 11 having a socket 12 disposed on one end thereof and a transversely affixed handle 13 disposed on the other end. The handle 13 may be affixed to the body 11 by means of cross drilling a hole in the body 11 and pressing the handle 13 into this cross drilled hole. A prying tool 14 is disposed on at least one end of the handle 13.

The prying tool 14 of FIG. 2 is a chisel-tipped element, not unlike a screwdriver blade. This can be used by slipping the end of the blade 14 between the edge of a cover disposed over the fastener and then rotating the implement about the axis of the handle 13, using the body portion 11 for leverage. An alternative prying tool 14A is shown in FIG. 2A in the form of a rounded end having an extended circumferential edge meeting the handle 13 in a planar junction. This variation of the prying tool is used by slipping the circumferential portion of the end 14A between the fastener cover and the wheel cover and then rotating the tool about an axis normal to the handle 13, using the main body 11 for leverage. In either event, the prying tool is an integral part of the wrench 10 so that it is always available with the wrench as a matter of convenience, and the body portion of the wrench itself is used to develop the necessary leverage to rotate the prying tool.

The socket 12 is generally cylindrical in cross section and has a relatively thin outer wall and an open, recessed portion. A cylindrical pin 15 is disposed on the axis of wrench 10 within the recess. This pin 15 extends to about the end plane of the socket 12 and has a beveled portion 15A adjacent its outer end.

A plurality of key elements 16 are disposed around the inner periphery of the wall of the socket 12. These key elements 16 are generally raised sections of the wall and may have a triangular or rounded cross section. The key elements 16 extend from a point near the edge of the open end of the socket 12 a predetermined distance into the recess. The key elements 16 are generally disposed along the inner periphery in a predetermined coded pattern which is generally not symmetrical.

The fastener 30 in accordance with the present invention is shown having a cylindrical head 31 and a threaded shank 32. A plurality of lock impressions 33 are disposed axially along the outer periphery of the head 31. The lock impressions 33 are designed to match the code of the key elements 16 of the sprocket 12. If the codes do not match, then the particular key wrench 10 cannot be used to unscrew the fastener 30.

Both the wrench 10 and fastener 30 may be made of metal, such as steel or aluminum. The choice of metal is generally dependent upon the specific application for which the fastener is to be used.

As may be seen in FIGS. 2 and 4, the fastener 30 has a recess 35, axially disposed in the head 31 of the fastener 30. This recess 35 is adapted to mate with the cylindrical pin 15 of the socket 12. Also shown is a beveled or rounded surface 34 extending about the top surface of the head 31 of the fastener 30. This surface 34 provides a bearing surface for the outer ends of the key elements 16 as the wrench 10 is rotated to a position where the coded key elements match the coded lock impressions 33 of the fastener head 31. When the socket 12 fully engages the fastener head 31, the beveled surface 34 bears against a mating angled surface 36, thus stabilizing the wrench on the fastener. Beveled surface 17 is provided about the outer end of the recess 35 to facilitate entry of the pin into the recess during initial engagement of the socket and fastener.

The key elements 16 extend only part way into the socket 12, from the outer end of the socket 12 to the juncture of the axial wall portion and the angled surface 36, thus matching in extent the lock impressions 33 on the lower part of the fastener head 31. The key elements 16 are typically 0.15 to 0.20 inches long and about 0.030 inches high. The depth of the lock impressions is typically about 0.030 inches and the width thereof at the head periphery is typically 0.040 inches.

In operation, the socket 12 of the wrench 10 is adapted to be placed over the head of the fastener 30. To accomplish this, the socket 12 is generally placed over the fastener head 31 in a random manner with the pin 15 of the socket 12 being inserted into the corresponding recess 35 of the fastener 30. This generally aligns the socket 12 and fastener 30. The beveled edge 34 of the head 31 of the fastener 30 permits entry of the head 31 beyond the end plane of the socket 12 so that the flush end of pin 15 can reach the recess 35.

The wrench 10 is then rotated relative to the fastener 30. The wrench 10 and fastener 30 are free to rotate with the ends of the key elements 16 sliding on the abutted beveled surface 34 until such time as the key elements 16 and the slotted lock impressions 33 are aligned. At this time, the socket 12 slides over the head 31 of the fastener 30 and the key elements 16 fully engage the lock impressions 33. This allows the fastener 30 to be tightened or untightened as required by appropriate turning of the wrench 10.

The pin 15 in recess 35 in conjunction with beveled surface 34 serves to guide the socket 12 onto the head 31 while the socket 12 is being rotated into a position where the key elements 16 mate with the slotted lock impressions 33. These guide elements further assist in stabilizing the wrench 10 while torque is applied to tighten or untighten the fastener 30. The abutment of the angled surface 36 within the socket 12 against the beveled surface 34 of the fastener head 31 assists in this stabilization of the wrench 10 on the fastener 30 and maintains the two members in fixed alignment during the application of torque from the wrench 10 to the fastener 30. The angles of the beveled surface 34 and the angled portion 36 are preferably alike.

A typical application of the wrench and fastener combination of the present invention is that of automobile wheel cover locking bolts. A protective cap or the like may be removed using the prying tool 14 or 14A of the handle 13. The fastener 30 may be installed or removed using the wrench. Once installed, the fastener 30 is tamper-proof and cannot be removed except with the wrench 10, and only by authorized personnel.

Thus, there has been described an improved wrench and fastener combination which is designed to provide stabilization of the combination while tightening or untightening the fastener. The combination employs a guide pin and specially beveled or rounded areas on both the wrench and the fastener to permit ease of aligning and mating coded key elements and lock impressions in the parts. In addition, a wrench and fastener combination has been described which includes a handle having a prying tool which facilitates the removal of protective covers, or the like, which hide or obscure the fastener prior to installation or removal thereof.

Although there have been described above specific arrangements of a fastener and wrench combination in accordance with the invention for the purpose of illustrating the manner in which the invention may be used to advantage, it will be appreciated that the invention is not limited thereto. Accordingly, any and all modifications, variations or equivalent arrangements which may occur to those skilled in the art should be considered to be within the scope of the invention as defined in the annexed claims.

What is claimed is:

1. A fastener and wrench combination comprising:
    a fastener comprising a threaded shank and a circular head, said head having an outer beveled surface around the periphery thereof and having an outer cylindrical portion bearing a predetermined plurality of axially-slotted lock impressions arranged in a preselected code pattern, said head further having a central circular recess axially extending a predetermined depth therein with an inner beveled surface surrounding said recess at the opening thereof; and
    a wrench comprising a body with a socket at one end thereof, said socket having an entrance cross section adapted to mate with the head of said fastener, said socket being generally circular in cross section and having a plurality of coded key elements disposed on the inner periphery thereof which are adapted to match a corresponding code pattern of the slotted lock impressions of said fastener, said socket having a cylindrical pin disposed along the axis thereof for engaging the recess in the fastener; said pin being adapted to mate with said recess of said fastener in order both to centrally align the socket on the fastener while said socket is being rotated to the position where said key elements mate with said slotted lock impressions and to stabilize the wrench against misalignment as torque is transmitted from the wrench to the fastener.

2. The combination of claim 1 which further comprises a transversely affixed handle at the other end of said body, said handle having a prying tool disposed on at least one end thereof.

3. The combination of claim 2 wherein said prying tool comprises a chisel-like blade having an operative edge aligned generally parallel to the wrench body, such that the wrench body is effective to develop leverage in prying with the tool.

4. The combination of claim 2 wherein said prying tool comprises a rounded end having an extended circumferential skirt portion joined to the handle along a generally planar juncture, such that the wrench is effective to develop leverage in prying with the tool.

5. The combination of claim 1 wherein the cylindrical pin of the wrench socket has a beveled edge extending about the outer end thereof for initially guiding the pin toward the recess.

6. The combination of claim 1 wherein the socket further includes an angled surface extending circumferentially between a sidewall portion of the socket and the bottom thereof for mating with the outer beveled surface of the fastener head when the socket is in torque transmitting position on the fastener.

7. The combination of claim 6 wherein the angle of the angled surface of the socket is essentially the same as the angle of the outer beveled surface of the fastener head.

8. The combination of claim 1 wherein the outer beveled surface of the fastener head includes a bearing surface portion for supporting the ends of the key elements of the socket during rotation of the wrench relative to the fastener.

9. The combination of claim 6 wherein the key elements are mounted along the wall portion of the socket and terminate at the juncture of the angled portion with the wall portion.

10. The combination of claim 1 wherein the outer beveled surface of the fastener head comprises initial guide means for guiding the wrench socket into coaxial alignment with the fastener.

11. The combination of claim 10 wherein the cylindrical pin is wholly contained within the socket and it does not extend beyond the end plane thereof.

12. The combination of claim 11 wherein the end of the cylindrical pin is essentially flush with the end plane of the socket.

13. The combination of claim 10 wherein the cylindrical pin has a beveled edge extending about the outer end thereof and wherein the beveled edge of the pin and the inner beveled surface surrounding the recess of the fastener head comprise guide means for guiding the pin into the recess after the socket is initially guided toward coaxial alignment by the initial guide means.

14. The combination of claim 6 wherein the pin and recess acting together and the outer beveled surface of the fastener head and said angled surface mating with said outer beveled surface all coact to stabilize the wrench in torque-transmitting position on the fastener head.

15. A fastener and wrench combination comprising:
a fastener having a threaded shank and a circular head affixed thereto;
a wrench having a handle coupled to a cylindrical socket adapted to fit over the head of the fastener;
a plurality of inwardly projecting, axially extending key elements mounted along an axial wall portion of the socket and arrayed thereon in accordance with a preselected key code;
a corresponding plurality of slots extending axially along a portion of the outer circular wall of the fastener head and arrayed thereabout in accordance with a predetermined key code to form lock impressions for receiving said key elements, the key elements being effective to prevent engagement of the socket and fastener head in torque-transmitting relationship unless the relative positions of the lock impressions and key elements match in a corresponding preselected key code; and
first and second guide means for guiding the socket into coaxial position partially surrounding the fastener head, the first guide means comprising an outer beveled surface extending about the outer face of the fastener head to guide the socket toward a concentric position relative to the head, the second means comprising a coaxial recess extending partially along the axis of the fastener from the outer face of the head and a central pin extending from the base of the socket outwardly along the axis thereof to enter said recess and maintain the socket in concentric position on the fastener head.

16. The combination of claim 15 wherein the pin has a diameter only slightly less than the diameter of the recess and wherein the second guide means further comprise an inner beveled surface extending about the outer end of the recess adjacent the outer face of the head for guiding the pin toward the entrance of the recess.

17. The combination of claim 16 wherein the second guide means further comprise a beveled surface surrounding the end of the pin for guiding the pin toward a concentric position relative to the recess.

18. The combination of claim 15 wherein the pin and recess and the outer beveled surface of the head further comprise stabilizing means for stabilizing the socket in torque-transmitting relationship on the fastener head when the socket is positioned fully on the head with the key elements mated with the lock impressions, the stabilizing means further including an angled surface extending about the base of the socket between the base and the socket sidewall, said angled surface having an angle corresponding to the angle of the outer beveled surface of the head for maintaining contact therewith when the socket is fully positioned on the head.

19. The combination of claim 18 wherein the key elements terminate at the juncture between the angled surface and the sidewall of the socket and extend from said juncture to the end plane of the socket.

20. The combination of claim 15 wherein the end of the central pin is essentially flush with said end plane.

21. The combination of claim 15 wherein said outer beveled surface comprises bearing surface means for supporting the outer ends of the key elements thereagainst as the wrench is rotated relative to the fastener toward a position of alignment of all key elements with corresponding lock impressions of the head.

22. A key wrench for mating with a plurality of slotted lock impressions in the circular head of a threaded fastener, the wrench comprising:
a handle and a cylindrical socket adapted to fit over the head of the fastener;
a plurality of inwardly projecting, axially extending key elements mounted along an axial wall portion of the socket and arrayed thereon in accordance with a preselected key code, the key elements being effective to prevent engagement of the socket and fastener head in torque-transmitting relationship unless the relative positions of the lock impressions and key elements match in a corresponding preselected key code; and
guide means for guiding the socket into coaxial position partially surrounding the fastener head, comprising a central pin extending from the base of the socket outwardly along the axis thereof to enter a central recess in the fastener and maintain the socket in concentric position on the fastener head.

23. The wrench of claim 22 wherein the pin has a diameter only slightly less than the diameter of the recess.

24. The wrench of claim 23 wherein the guide means further comprise a beveled surface surrounding the end of the pin for guiding the pin toward a concentric position relative to the recess.

25. The wrench of claim 23 wherein the pin further comprises stabilizing means for stabilizing the socket in torque-transmitting relationship on the fastener head when the socket is positioned fully on the head with the key elements mated with the lock impressions, the stabilizing means further including an angled surface extending about the base of the socket between the base and the socket sidewall, said angled surface having a predetermined angle for mating with an outer beveled surface of the fastener head having an angle corresponding to said predetermined angle when the socket is fully positioned on the head.

26. The wrench of claim 25 wherein the key elements terminate at the juncture between the angled surface and the sidewall of the socket and extend from said juncture to the end plane of the socket.

27. The wrench of claim 26 wherein the end of the central pin is essentially flush with said end plane.

28. The wrench of claim 26 further including a prying tool formed as an integral part of the handle.

29. A fastener for securing an automobile wheel cover against theft and adapted to mate with a key wrench having a socket with a plurality of inwardly projecting, axially extending key elements mounted along an axial wall portion of the socket and arrayed thereon in accordance with a preselected key code, the fastener comprising:

a plurality of slots extending axially along a portion of the outer circular wall of the fastener head and arrayed thereabout in accordance with a predetermined key code to form lock impressions for receiving said key elements, said outer wall being effective to prevent engagement of the socket and fastener head in torque-transmitting relationship unless the relative positions of the lock impressions and key elements match in a corresponding preselected key code; and first and second guide means for guiding the socket into coaxial position partially surrounding the fastener head, the first guide means comprising an outer beveled surface extending about the outer face of the fastener head to guide the socket toward a concentric position relative to the head, the second means comprising a coaxial recess extending partially along the axis of the fastener from the outer face of the head for receiving a central pin extending from the base of the socket.

30. The fastener of claim 29 wherein the second guide means further comprise an inner beveled surface extending about the outer end of the recess adjacent the outer face of the head for guiding the pin toward the entrance of the recess.

31. The combination of claim 29 wherein the recess and the outer beveled surface of the head further comprise stabilizing means for stabilizing the socket in torque-transmitting relationship on the fastener head when the socket is positioned fully on the head with the key elements mated with the lock impressions.

32. The combination of claim 29 wherein said outer beveled surface comprises bearing surface means for supporting the outer ends of the key elements thereagainst as the wrench is rotated relative to the fastener toward a position of alignment of all key elements with corresponding lock impressions of the head.

* * * * *